United States Patent
Pasquet et al.

[11] Patent Number: 6,164,336
[45] Date of Patent: Dec. 26, 2000

[54] HYDRAULIC CAPACITY WITH CONTROLLED PRESSURE ABSORPTION

[75] Inventors: Thierry Pasquet, Livry Gargan; Jean-Pierre Delage, Saint Mande; Jean Fourcade, Les Lilas, all of France

[73] Assignee: Bosch Systemes de Freinage, Drancy, France

[21] Appl. No.: 09/331,944

[22] PCT Filed: Jun. 8, 1999

[86] PCT No.: PCT/FR99/01344

§ 371 Date: Jun. 29, 1999

§ 102(e) Date: Jun. 29, 1999

[87] PCT Pub. No.: WO00/00373

PCT Pub. Date: Jan. 6, 2000

[30] Foreign Application Priority Data

Jun. 26, 1998 [FR] France ................................ 98 08101

[51] Int. Cl.$^7$ ................................................ F16L 55/04
[52] U.S. Cl. ................................ 138/30; 138/26; 303/87
[58] Field of Search ........................ 138/26, 30, 32; 303/87

[56] References Cited

U.S. PATENT DOCUMENTS

| | | |
|---|---|---|
| 1,950,107 | 3/1934 | Guinn et al. ............................ 138/30 |
| 3,160,407 | 12/1964 | Vaugoyeau . |
| 4,687,188 | 8/1987 | Knurek et al. ....................... 267/140.1 |
| 5,682,923 | 11/1997 | Goloff et al. ............................ 138/30 |
| 5,803,555 | 9/1998 | Schaefer .................................. 138/30 |
| 6,056,013 | 5/2000 | Sasaki et al. ........................... 138/30 |
| 6,076,557 | 6/2000 | Carney .................................... 138/30 |

*Primary Examiner*—James Hook
*Attorney, Agent, or Firm*—Leo H. McCormick, Jr.; Warren Comstock

[57] ABSTRACT

A hydraulic capacity having a hollow body (2) made of a rubber material and a rigid body (3) which surrounds the hollow body (2) to limit the expansion of the hollow body (2). The hydraulic capacity containing at each instant an instantaneous volume (V) of fluid to which an instantaneous pressure is applied as a function of the instantaneous volume (V). The hollow body (2) has a wall (21) which is simultaneously in contact with the casing (3) and at least via of a first zone (Z1) and a second zone (Z2). The first zone (Z1) has a first thickness (E1) and the second zone (Z2) has a second thickness (E2) which are separated from each other by a third zone (Z3) having a third thickness (E3). The third zone (Z3) being separated from the casing (3) and the third thickness (E3) being different than the first (E1) and second (E2) thickness such that an instantaneous pressure (P) of the fluid is controlled according to a predefined relationship.

8 Claims, 2 Drawing Sheets

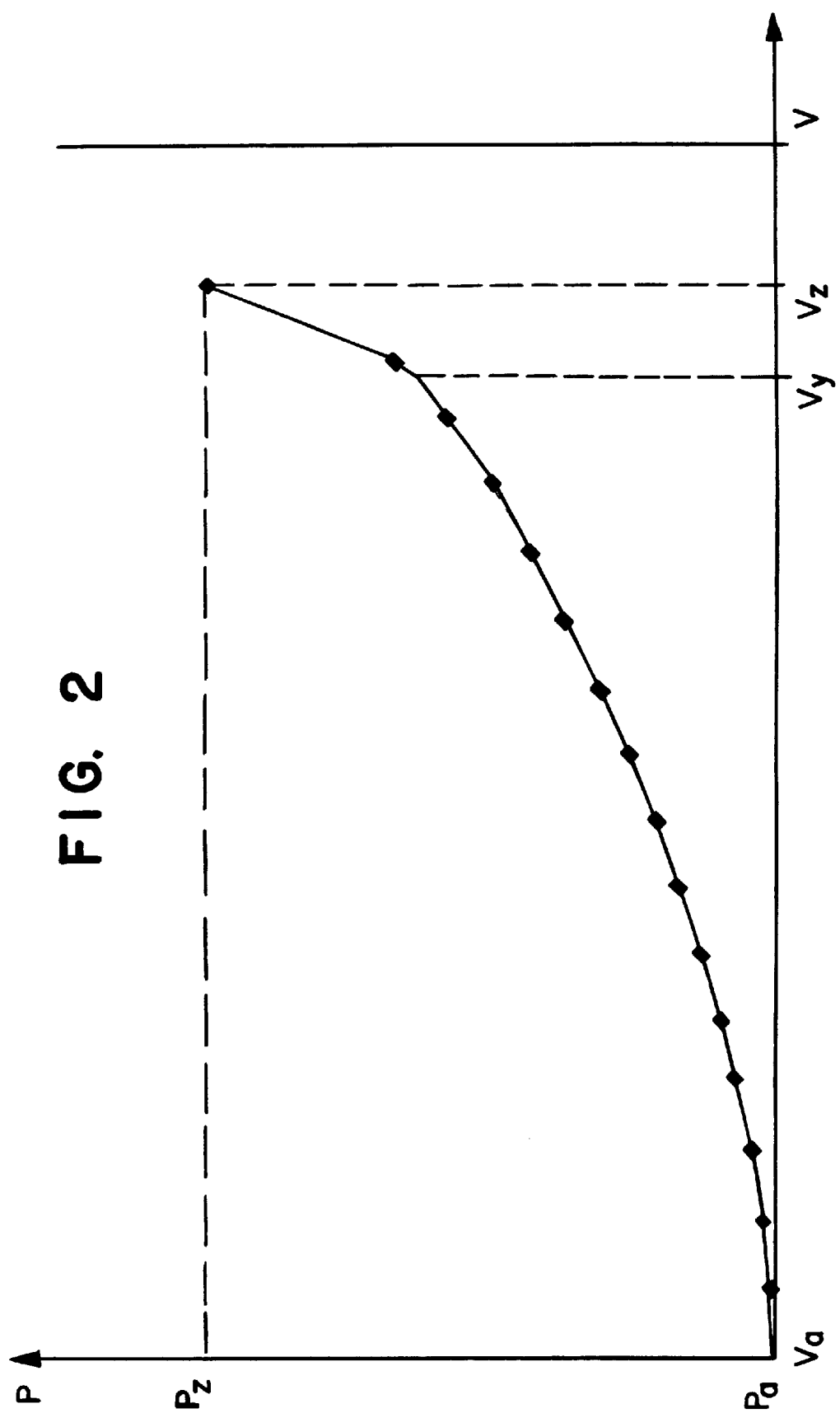

6,164,336

HYDRAULIC CAPACITY WITH CONTROLLED PRESSURE ABSORPTION

The present invention relates to a hydraulic capacity, for example one which can be used as a variable-pressure accumulator in a braking circuit.

More specifically, the present invention relates to a hydraulic capacity comprising a hollow body which is elongate along an axis, and a rigid casing, the hollow body being made of a material that can withstand elastic expansion from a state of rest, at least in a radial direction with respect to the axis, the hollow body being defined, at rest, by a wall the thickness of which is between a minimum thickness and a maximum thickness, this wall being bordered by an orifice which is stationary with respect to the rigid casing, the rigid casing surrounding the hollow body in order to limit its expansion, and this capacity being intended to contain, at every instant, an instantaneous volume of fluid which can change between a minimum volume and a maximum volume, this capacity applying to the instantaneous volume of fluid an instantaneous pressure that depends on the instantaneous volume.

A hydraulic capacity of this type is known and for example described and illustrated in patent document WO 98/00320.

BACKGROUND OF THE INVENTION

In actual fact, this patent document forms part of a far wider prior art which also contains, in particular, patents U.S. Pat. Nos. 3,948,288 or 5,718,488 and which aims to produce a pressure-fluctuation damper.

The invention falls within a very different context and aims to produce a capacity that can be used as a hydraulic accumulator capable of applying to the fluid it contains a pressure that is connected, through a predetermined relationship, to the volume of fluid accumulated, it being possible for such an accumulator to act as a brake-actuation simulator, of the type described, for example, in patent documents FR-2,753,949 and FR-2,756,797.

SUMMARY OF THE INVENTION

To this end, the hydraulic capacity of the invention, which in other respects is in accordance with the definition given in the above preamble, is essentially characterized in that the wall of the hollow body, at least for a first instantaneous volume of fluid, is simultaneously in contact with the casing at least via a first zone and a second zone of this wall, which zones are distant from the orifice, having first and second respective thicknesses and separated from each other by a third zone distant from the casing and having a third thickness different from the first and second thicknesses.

In order to follow with optimum precision the predetermined relationship that is supposed to connect the pressure of the stored fluid to the volume of the latter, it may be beneficial for the first and second thicknesses to be given different values from each other.

In one possible embodiment of the invention, the hollow body has an internal surface which is essentially cylindrical at rest.

The wall may furthermore achieve its minimum thickness at one end of the hollow body, this being the opposite end to the orifice, and at this end may have an external surface which, at rest, lies inside a cylinder of a first diameter.

In this case, it is possible to envisage that the casing, opposite the end of the hollow body, should form a cylinder of a second diameter, greater than the first diameter.

Finally, the wall may achieve its maximum thickness at a number of intermediate zones lying axially between the orifice and the end of the hollow body, and in which zones the wall has an external surface which, at rest, lies inside a cylinder of a third diameter, greater than the second diameter.

Other features and advantages of the invention will emerge clearly from the description thereof given hereafter by way of non-limiting indication, with reference to the appended drawings.

BRIEF DESCRIPTION OF THE DRAWINGS

FIG. 2 is a diagram illustrating a relationship between the change in pressure of a fluid stored in the capacity of FIG. 1 and the volume of this fluid.

DETAILED DESCRIPTION OF THE INVENTION

Figure 1:
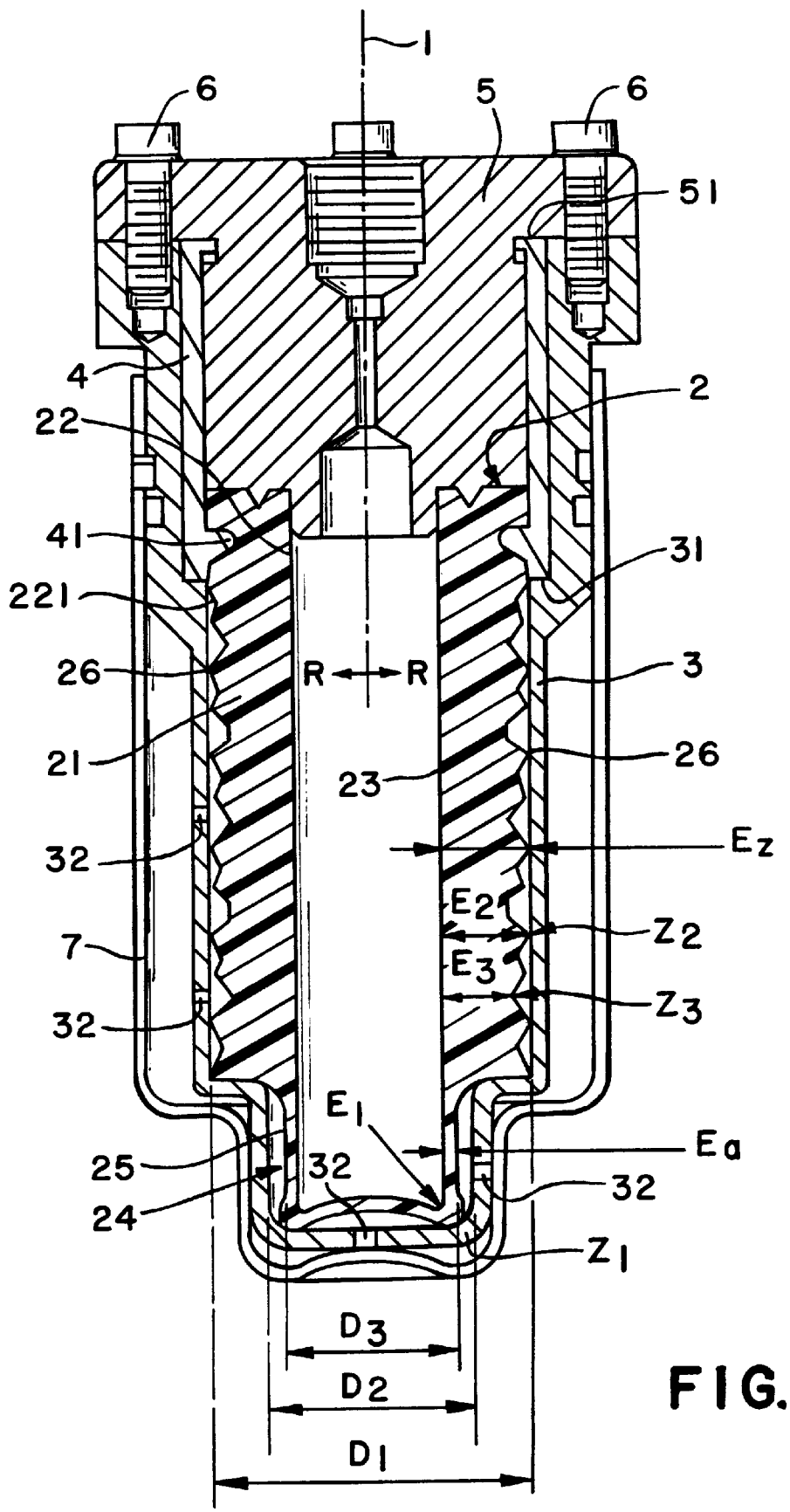
FIG. 1 is a sectional view of a capacity in accordance with the invention.
Figure 1:
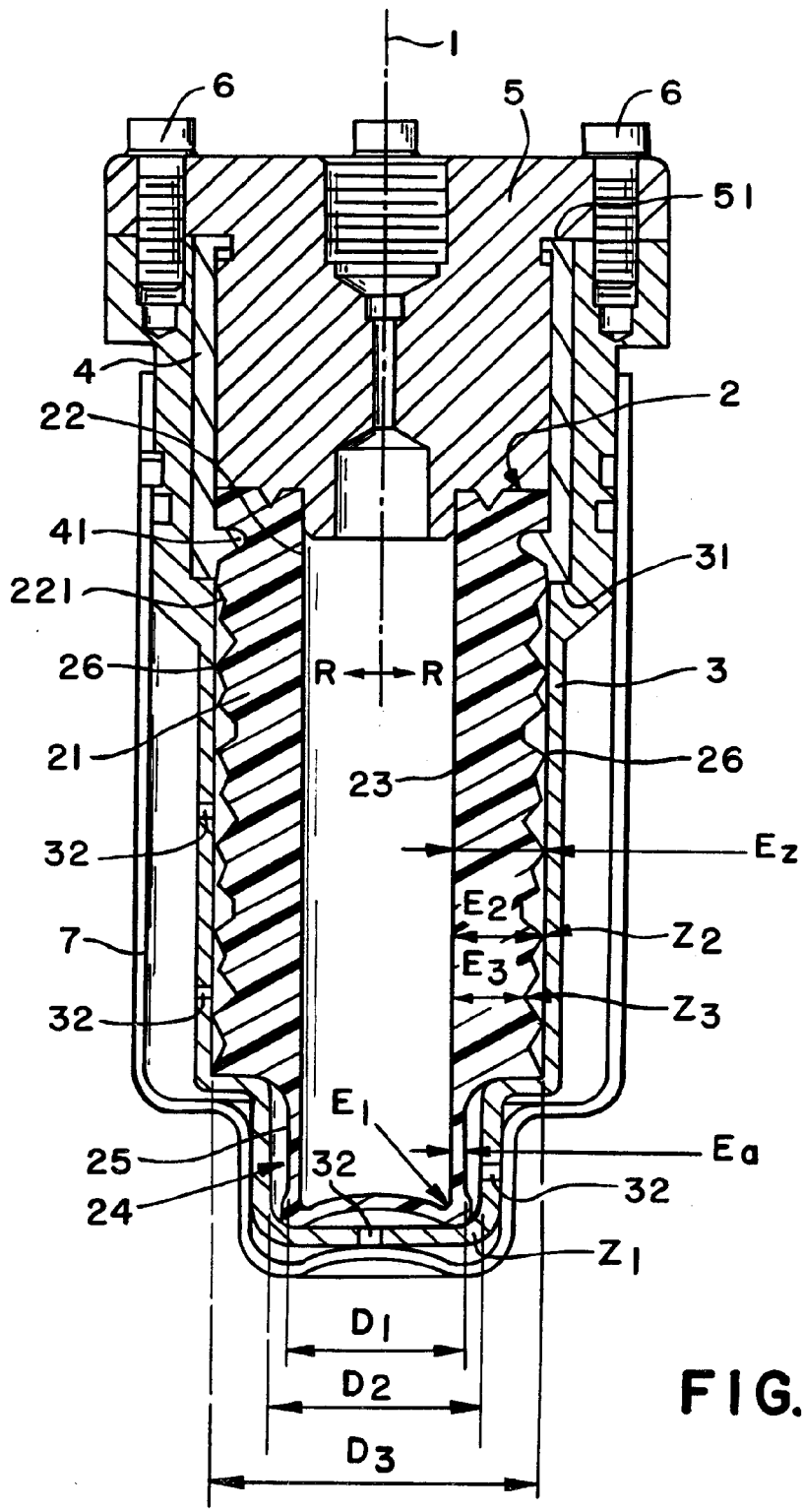

The invention relates to a hydraulic capacity, essentially comprising a hollow body 2 of elongate shape along an axis 1, and a rigid casing 3 surrounding the hollow body 2.

The wall 21 of the hollow body is, near to the inlet-outlet orifice 22 thereof, equipped with a groove 221 which is mounted over a rib 41 formed at the internal periphery of a holding collar 4.

The collar 4 is itself inserted between the rigid casing 3 and a hydraulic connection 5 which opens into the orifice 22 of the hollow body, this connection being fixed to the rigid casing 3 using screws 6, and the collar 4 being immobilized in the direction of the axis 1 by resting on respective shoulders 31, 51 of the casing and of the connection.

A cap 7 may be fitted over the rigid casing 3 to protect it from contamination from its surroundings.

The hollow body 2 is made of an elastomeric material, for example rubber, so that it can, without damage, undergo elastic expansion in a radial direction R, and possibly also in the direction of the axis 1, from a state of rest which is the state illustrated by FIG. 1, the expansion of the hollow body 2 being blocked when the wall 21 is fully in contact with the rigid casing 3.

The wall 21 of the hollow body 2 has, at rest, a thickness that is between a minimum thickness Ea and a maximum thickness Ez.

The capacity thus formed is intended to contain, at each instant, an instantaneous volume V of fluid which volume is able to change between a minimum volume Va and a maximum volume Vz (FIG. 2), the elastic wall 21 making it possible, according to the present invention, for there to be applied to the instantaneous volume V of fluid, an instantaneous pressure P which depends on the instantaneous volume V according to a predetermined relationship like the one illustrated in FIG. 2.

According to the invention, the wall 21 is simultaneously in contact with the casing 3 via at least first and second zones Z1, Z2 of this wall, and is so at least for a given instantaneous volume of fluid, FIG. 1 depicting, in this instance, the case where this volume is equal to Va and where the hollow body is in its state of rest.

These first and second zones Z1, Z2 which are distant from the orifice 22, have first and second respective thicknesses E1, E2 and are separated from each other by a third zone Z3, this third zone being itself distant from the casing 3 and having a third thickness E3 different from the first and second thicknesses E1, E2.

In actual fact, it may be advantageous to shape the wall 21, either by successive trials and interpolation, or more easily using the conventional methods of computer simulation, in such a way that zones such as Z1, Z2 and Z3 that meet the previously described conditions should appear for a number of different values of the instantaneous volume of fluid, in order to allow the capacity of the invention to follow as closely as possible the predefined relationship that is supposed to connect the instantaneous pressure P to the instantaneous volume V, as illustrated in FIG. 2.

As FIG. 1 shows, different values may also be attributed to the respective thicknesses E1, E2 of the first and second zones Z1, Z2, so as to increase the number of parameters that allow the absorption of the capacity to be varied, in order to adapt it to the predefined relationship by means of which the instantaneous pressure P is intended to be connected to the instantaneous volume V.

In the example illustrated in FIG. 1, the hollow body 2 has an internal surface 23 which is essentially cylindrical at rest, the wall 21 reaching its minimum thickness Ea at one end 24 of the hollow body 2, which is the opposite end to the orifice 22, and at this end 24 having an external surface 25 which, at rest, lies inside a cylinder of a first diameter D1.

The casing 3, facing the end 24 of the hollow body 2, therefore forms a cylinder of a second diameter D2, greater than the first diameter D1.

Finally, the wall 21, in the example illustrated, reaches its maximum thickness Ez at a number of intermediate zones 26 located axially between the orifice 22 and the end 24 of the hollow body 2, and in which zones the wall 21 has an external surface which, at rest, lies inside a cylinder of a third diameter D3, greater than the second diameter D2.

In every instance, openings 32 may be made in the rigid casing 3 to allow the air trapped between the hollow body 2 and this casing 3 to escape.

The principle of operation of the capacity illustrated is as follows.

In general, when a certain volume of hydraulic fluid is injected into the hollow body 2, the expansion of the latter occurs, as a priority, in those zones of the wall 21 which are both not in contact with the rigid casing 3, and are the thinnest.

Furthermore, the resistance offered by the hollow body to its expansion, expressed in terms of increase in instantaneous pressure P for a given increase in instantaneous volume V is an increasing function of the thickness of the wall 21 in the zone where this hollow body is undergoing its expansion, and a decreasing function of the surface area of the zone undergoing the expansion.

For low values of instantaneous volume of fluid V, that is to say for values of this volume which are little above the minimum volume Va contained in the hollow body at rest, any increase in this volume therefore causes radial and axial expansion of the end 24 of the hollow body 2, the thickness of which is at a minimum, and the resistance offered by the hollow body to its expansion is relatively small.

Under these conditions, any increase in the instantaneous volume V, at low values thereof, is associated with a slight increase in instantaneous pressure P.

As the instantaneous volume V gradually increases, the surface area of the end 24, which finds itself in contact with the rigid casing 3 increases, which means that the end surface 24 that can still undergo expansion decreases, this causing an incremental increase in instantaneous pressure P for constant increments of instantaneous volume V.

This situation can be identified, in FIG. 2, by the fact that the curve representing pressure P as a function of volume V has an upward-facing concave portion.

When the volume V reaches a value Vy, the end 24 of the hollow body is completely pressed against the rigid casing 3, it being impossible for the hollow body to experience any further expansion other than in its upper part.

As the latter has a thickness that exceeds that of the end 24, the pressure P varies more quickly for the same increase in volume than for volumes below Vy, this variation depending on the distribution of the zones of thicknesses such as E2, E3, Ez, in accordance with the principles set out above.

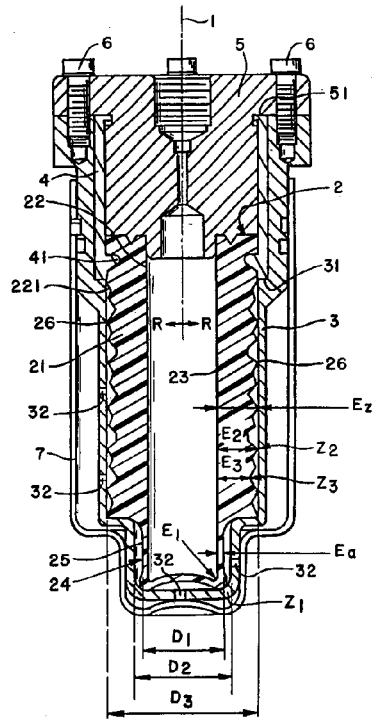

What is claimed is:

1. A hydraulic capacity comprising:

a hollow body which is having an elongated along an axis; and a rigid casing, said hollow body being made of a material that can withstand elastic expansion from a state of rest, at least in a radial direction with respect to said axis, said hollow body being defined, at rest, by a wall having a thickness which is between a minimum thickness and a maximum thickness, said wall being bordered by an orifice which is stationary with respect to said rigid casing, said rigid casing surrounding said hollow body to limit the expansion of said hollow body to define a capacity having at every instant an instantaneous volume of fluid which can change between a minimum volume and a maximum volume of fluid, said capacity applying an instantaneous pressure to said instantaneous volume as a function of said instantaneous volume, characterized in that said wall, at least for a first instantaneous volume of fluid is simultaneously in contact with said casing at least via a first zone and a second zone of said wall, said first and second zones being distant from said orifice, said first and second zones having first and second respective thickness which are separated from each other by a third zone having third thickness different from said first and second thickness.

2. The hydraulic capacity according to claim 1 characterized in that said first and second thicknesses are different from each other.

3. The hydraulic capacity according to claim 2 characterized in that said hollow body has an internal surface which is essentially cylindrical at rest.

4. The hydraulic capacity according to claim 2 characterized in that said wall reaches a minimum thickness at a first end of said hollow body which is opposite to the orifice, said first end having an external surface which at rest lies inside of a first diameter of a cylinder of said casing.

5. The hydraulic capacity according to claim 4 characterized in that said wall has a maximum thickness at a number of intermediate zones lying axially between said orifice and said first end of said hollow body, said wall in said zones having an external surface which at rest lies inside a cylinder having a third diameter which is greater than said second diameter.

6. The hydraulic capacity according to claim 4 characterized in that said casing has a cylinder with a second diameter opposite the end of said hollow body which is greater than said first diameter.

7. The hydraulic capacity according to claim 6 characterized in that said wall has a maximum thickness at a number of intermediate zones lying axially between said orifice and said first end of said hollow body, said wall in said zones having an external surface which at rest lies inside a cylinder having a third diameter which is greater than said second diameter.

8. The hydraulic capacity according to claim 1 characterized in that said hollow body has an internal surface which is essentially cylindrical at rest.

* * * * *

UNITED STATES PATENT AND TRADEMARK OFFICE
CERTIFICATE OF CORRECTION

PATENT NO.   : 6,164,336
DATED        : December 26, 2000
INVENTOR(S)  : Thierry Pasquet et al.

It is certified that error appears in the above-identified patent and that said Letters Patent is hereby corrected as shown below:

<u>Title page,</u>
The Title page should be deleted and substitute therefore the attached Title page.

<u>Drawings,</u>
Figure 1, $D_1$ and $D_3$ are reversed and so corrected in the attached drawing.

Signed and Sealed this

Seventeenth Day of December, 2002

JAMES E. ROGAN
*Director of the United States Patent and Trademark Office*

United States Patent [19]
Pasquet et al.

[11] Patent Number: 6,164,336
[45] Date of Patent: Dec. 26, 2000

[54] HYDRAULIC CAPACITY WITH CONTROLLED PRESSURE ABSORPTION

[75] Inventors: Thierry Pasquet, Livry Gargan; Jean-Pierre Delage, Saint Mande; Jean Fourcade, Les Lilas, all of France

[73] Assignee: Bosch Systemes de Freinage, Drancy, France

[21] Appl. No.: 09/331,944
[22] PCT Filed: Jun. 8, 1999
[86] PCT No.: PCT/FR99/01344
§ 371 Date: Jun. 29, 1999
§ 102(e) Date: Jun. 29, 1999
[87] PCT Pub. No.: WO00/00373
PCT Pub. Date: Jan. 6, 2000

[30] Foreign Application Priority Data

Jun. 26, 1998 [FR] France .................................. 98 08101

[51] Int. Cl.[7] .................................................. F16L 55/04
[52] U.S. Cl. ........................... 138/30; 138/26; 303/87
[58] Field of Search ................................ 138/26, 30, 32; 303/87

[56] References Cited

U.S. PATENT DOCUMENTS

| 1,950,107 | 3/1934 | Guinn et al. ........................ 138/30 |
| 3,160,407 | 12/1964 | Vaugoyeau. | |
| 4,687,188 | 8/1987 | Knurek et al. ...................... 267/140.1 |
| 5,682,923 | 11/1997 | Goloff et al. ...................... 138/30 |
| 5,803,555 | 9/1998 | Schaefer ............................ 138/30 |
| 6,056,013 | 5/2000 | Sasaki et al. ...................... 138/30 |
| 6,076,557 | 6/2000 | Carney ............................... 138/30 |

Primary Examiner—James Hook
Attorney, Agent, or Firm—Leo H. McCormick, Jr.; Warren Comstock

[57] ABSTRACT

A hydraulic capacity having a hollow body (2) made of a rubber material and a rigid body (3) which surrounds the hollow body (2) to limit the expansion of the hollow body (2). The hydraulic capacity containing at each instant an instantaneous volume (V) of fluid to which an instantaneous pressure is applied as a function of the instantaneous volume (V). The hollow body (2) has a wall (21) which is simultaneously in contact with the casing (3) and at least via of a first zone (Z1) and a second zone (Z2). The first zone (Z1) has a first thickness (E1) and the second zone (Z2) has a second thickness (E2) which are separated from each other by a third zone (Z3) having a third thickness (E3). The third zone (Z3) being separated from the casing (3) and the third thickness (E3) being different than the first (E1) and second (E2) thickness such that an instantaneous pressure (P) of the fluid is controlled according to a predefined relationship.

8 Claims, 2 Drawing Sheets